Patented Nov. 25, 1947

2,431,454

UNITED STATES PATENT OFFICE 2,431,454

PREPARATION OF LOW MOLECULAR WEIGHT OLEFIN POLYMERS

Henry Berk, Elizabeth, and David W. Young, Roselle, N. J., assignors to Standard Oil Development Company, a corporation of Delaware No Drawing. Application December 20, 1945, Serial No. 636,252

7 Claims. (Cl. 260—683)

This invention relates to a catalytic treatment of relatively high molecular weight olefin polymers to prepare low molecular weight olefin polymers, such as dimers, trimers, and tetramers of $C_3$ to $C_5$ olefins.

In processes developed for the polymerization of olefins, particularly normally gaseous olefins such as propylene, normal butylenes, isobutylene, and amylenes, the polymer products formed have a wide range of molecular weights and often include sticky liquid polymers having molecular weights from about 400 to 2000. These sticky liquid polymers have limited usefulness. One well known type of polymerizing process involves reaction of the olefins in the presence of a Friedel-Crafts catalyst at temperatures below 0° C. Also, in a sulfuric acid polymerization of butylenes the formation of polymers heavier than tetramers is unavoidable in attempts to produce high yields of dimers and trimers, and such heavier polymers known as bottoms are a relatively less useful by-product.

Although it is possible to depolymerize high molecular weight olefinic polymers by the action of heat, the heat or thermal depolymerization which occurs at temperatures above 343° C. for polymers having molecular weights above 400 causes splitting off of monomeric units and the resulting decomposed polymers do not have uniform low molecular weights even after a considerable period of decomposition while the polymers are mostly converted to the gaseous monomer.

An object of this invention is to provide a method of depolymerizing the relatively high molecular weight polymers without substantial decomposition to the monomers, such as caused by thermal depolymerization, to obtain high yields of polymers having molecular weights in the range of about 84 to 320.

A more specific object of this invention is to provide an efficient process of modifying the relatively high molecular weight olefin polymers, particularly the sticky and viscous liquid polymers with suitable control to form desired high yields of dimers, trimers, and tetramers which boil in the range of 93.3° C. to 343° C. without decomposition.

A method now found suitable for attaining the objects set forth and additional objects which will become apparent from the following description subjects the relatively high molecular weight olefin polymers to a controlled depolymerizing action of a Friedel-Crafts catalyst under suitable temperatures and in a suitable medium for keeping the polymers in solution with the catalyst during an appropriate reaction period.

The present invention provides a method adapted for use as a subsequent step to a low temperature polymerization of olefins with a Friedel-Crafts catalyst in a medium which acts as a solvent for the polymers formed, because the resulting solution of the polymers formed is readily treated with a required amount of active catalyst under required conditions for accomplishing the depolymerization.

In the polymerizing step, by using active metal halides of the Friedel-Crafts type, such as aluminum chloride, aluminum bromide, titanium tetrachloride, boron trifluoride, or equivalents, the olefin polymers are very rapidly polymerized at temperatures below 0° C. to polymers having molecular weights mainly above 400 and generally averaging above 800. The average molecular weight of the polymers is increased as the temperature is lowered. At temperatures of the order of −40° C. to below −100° C., the polymers formed are largely solid polymers with molecular weights higher than 30,000.

For the subsequent controlled catalytic depolymerizing reaction or modifying step, the polymers formed are maintained in solution or dispersed in a suitable solvent and are contacted with a dissolved Friedel-Crafts type metal halide catalyst until a desired amount of depolymerizing is effected at temperatures sufficiently low to prevent thermal decomposition or substantial formation of monomers.

The same kind of catalyst may be used for the depolymerizing action as is used in the polymerizing step, but in some instances it may be desired to use a different Friedel-Crafts type catalyst for the depolymerizing in order to have increased solubility in the solvent and in order to have better control of the depolymerizing action at elevated temperatures.

The rate of the depolymerizing action in the presence of the catalyst increases as the reaction temperature is raised, beginning with a temperature of about −25° C., or the boiling point of methyl chloride. At temperatures below −25° C. the depolymerizing action, if any, is too slow to be of practical use. The depolymerizing reaction can be satisfactorily controlled at temperatures ranging from about −25° C. to about +100° C. At low temperatures of about 0° C. down to about −25° C., the period of reaction or contact time required for practical yields is a number of hours. Therefore, it is preferable to conduct the catalytic depolymerizing action at temperatures above about 0° C. At temperatures approaching +100° C., the contact time required is only a few minutes. As the temperature is raised to above 100° C. reaction may become too rapid for satisfactory control, and finally reach a point at which decomposition to monomer occurs as in thermal decomposition.

The relatively high molecular weight polymers to be subjected to the catalytic depolymerizing action can be adequately dispersed, solvated, or dissolved in various liquids for contact with the dissolved catalyst. The liquid paraffinic hydrocarbons such as butane, pentane, low boiling paraffinic naphthas, carbon disulfide, or low boiling alkyl halides, such as methyl chloride, or ethyl chloride, are suitable for use as the liquid medium in the catalytic depolymerizing reaction. The preferred reaction media or solvents for the polymers and catalysts are those which boil at the desired reaction temperature to maintain automatically a predetermined reaction temperature level under atmospheric or superatmospheric temperature. The solvent or liquid media should not poison or deactivate the catalyst to prevent the functioning of the catalyst during the reaction.

If a sufficient excess of Friedel-Crafts type catalyst is used in the low temperature polymerizing step no additional or less additional active catalyst may be necessary in the subsequent depolymerizing treatment. Also, as the temperature in the polymerizing step is brought closer to 0° C., more polymers having molecular weights in the range of 400 to 2000 may be formed, and these polymers are more rapidly modified to produce the lower molecular weight polymers in the subsequent catalytic depolymerizing treatment. The more viscous and soft plastic polymers of somewhat higher molecular weights can be modified at fairly rapid rates.

The catalytic depolymerizing treatment of the relatively high molecular weight polymers may be conducted on a batch, semi-continuous, or continuous basis, the latter more conveniently at higher temperatures which permit more rapid reaction. The solvent medium on being vaporized from the catalytic depolymerized reaction mixture may be recovered as a condensate to be refluxed or recycled. Also, part or all of the reaction mixture may be subjected to flash vaporization to vaporize and fractionate the low molecular weight polymers formed, and higher polymers requiring further treatment may be recycled for further depolymerizing reaction. Metal halide catalysts used in the depolymerizing reaction may also be recovered for reuse in the treatment.

For the purpose of illustration the following description of a test operation is presented:

Example

To 1000 ml. of a 20% propylene-70% isobutylene-10% amylene liquid feed was added 3000 ml. of methyl chloride. To this solution of the feed was added 200 ml. of AlCl$_3$ in ethyl chloride catalyst solution. The concentration of AlCl$_3$ in the ethyl chloride was 5.6 g. per 100 ml. Polymer formed as the catalyst solution was added to the methyl chloride solution of the feed at about −25° C. This polymer product had an average molecular weight above 800.

Subsequently 15 g. of AlBr$_2$Cl catalyst was added to the resulting solution of the polymer formed in the methyl chloride and the mixture was agitated in a Dewar flask for 36 hours, methyl chloride and ethyl chloride being vaporized during this reaction period. Finally, the modified liquid polymer products were removed from the reaction vessel and tested for distillation range. A. S. T. M. distillation results noted were:

|  | ° F. | ° C. |
|---|---|---|
| Initial B. Pt | 208.4 | 98 |
| 10% over | 361.4 | 183 |
| 50% over | 386.6 | 197 |
| 70% over | 561.2 | 294 |
| End Point | 633.2 | 334 |

The foregoing results show that the depolymerizing treatment was under good control for converting the relatively high molecular weight olefin polymers to polymers boiling in the range of about 200° F. to 650° F. The modified polymers were, in a large proportion, dimers and trimers of the C$_3$ to C$_5$ olefins.

When the catalytic depolymerizing reaction temperature is moderately raised to above 0° C., e. g., to the boiling point of ethyl chloride, the reaction is similarly under good control, but the reaction period is considerably reduced, for example, to about 30 minutes or less. At still higher catalytic depolymerizing temperatures, the rate of reaction is further increased, but a point is reached at which control cannot be effectively maintained to give high yields of dimers or trimers.

Tests on the hydrogenated fractions of the modified polymers boiling in the motor fuel ranges of 200° to 300° F. and 300° to 400° F. established that these polymers were highly branched. These hydrogenated polymer fractions gave high anti-knock ratings comparable to the anti-knock ratings of iso-octane and hydrogenated trimers of isobutylene.

Additional tests indicate that the low molecular weight polymers formed by the catalytic depolymerizing treatment are useful in formulating modified resins, as alkylating agents and for use in preparing valuable additives for rubber, resins, and oils.

The catalytic depolymerization reaction has noteworthy efficiency in controlling the conversion of the relatively higher molecular weight polymers to the more useful lower molecular weight polymers. This treatment may be applied to relatively high molecular weight polymers that are by-products of various polymerization processes and which have had little use on account of their low reactivity and thermal instability. The low molecular weight olefin polymers boiling in the range of 200° F. to about 650° F. are useful for alkylating phenols and can be distilled without undergoing substantial decomposition. The relatively higher molecular weight polymers cannot be satisfactorily used as alkylating agents and become thermally decomposed before they are vaporized.

The invention is not to be limited by specific examples presented. Variations of the procedure, reaction mixture ingredients, concentrations of the ingredients, reaction conditions, and time of reaction may be made within ascertainable limits.

We claim:

1. A method of preparing olefin polymers which boil without decomposition within the range of 93.3 C. to about 343° C. from relatively higher molecular weight olefin polymers, which comprises contacting said higher molecular weight polymers dispersed in a solution of a Friedel- Crafts type metal halide catalyst with an inert liquid solvent at a temperature in the range of —25° C. to about 100° C. for a period sufficiently long to convert said higher molecular weight polymers to the polymers boiling in the range of about 93.3° C. to about 343° C.

2. A method of preparing low molecular weight polymers of $C_3$ to $C_5$ olefins, which comprises the steps of dissolving relatively higher molecular weight polymers of $C_3$ to $C_5$ olefins in an inert liquid solvent, and contacting the dissolved polymers with a Friedel-Crafts catalyst dissolved in the solvent at a temperature in the range of —25° C. to about 100° C. for a period sufficiently long to convert said higher molecular weight polymers to polymers boiling in the range of about 93.3° C. to 343° C.

3. A method of preparing olefin polymers which boil in the range of 93.3° C. to 343° C. from relatively higher polymers having molecular weights above 400, which comprises contacting said higher molecular weight polymers in an inert liquid solvent with a dissolved Friedel-Crafts type metal halide catalyst at a depolymerizing reaction temperature in the range of —25° C. to about +100° C. for a period sufficiently long to convert said higher molecular weight polymers to polymers having molecular weights in the range of about 84 to 320, and vaporizing from the solution liquid solvent which boils at the reaction temperature.

4. A method of preparing olefin polymers which boil in the range of 93.3° C. to 343° C., which comprises the steps of dissolving relatively higher molecular weight olefin polymers in an inert liquid organic solvent which boils in the range of —25° C. to about +100° C., and contacting the dissolved polymers with a Friedel-Crafts type metal halide catalyst dissolved in the solvent while the solvent undergoes boiling for a period sufficiently long to convert said higher molecular weight polymers to polymers boiling in the range of about 93.3° C. to 343° C.

5. A method of preparing low molecular weight polymers of $C_3$ to $C_5$ olefins, which comprises the steps of dissolving $C_3$ to $C_5$ olefin polymers having molecular weights above 400 in an alkyl halide solvent which boils in the range of —25° C. to +100° C., and contacting the dissolved polymers at above about —25° C. with a Friedel-Crafts type aluminum halide catalyst dissolved in the solvent of liquid phase until polymers having molecular weights below 400 are formed from the dissolved polymers.

6. The method of preparing the dimer and trimer of a normally gaseous olefin from a higher polymer of the olefin, which comprises forming a liquid reaction mixture of the higher polymer with admixed Friedel-Crafts type catalyst and an inert liquid organic solvent for the catalyst, and depolymerizing the higher polymer by action of the catalyst dissolved in the mixture until the dimer and trimer are formed at a temperature in the range of about —25° C. to about +100° C. and sufficiently low to prevent thermal decomposition of the higher polymer to the monomer of the olefin.

7. The method as described in claim 6 in which the higher polymer has a molecular weight in the range of about 400 to 2000.

HENRY BERK.
DAVID W. YOUNG.

REFERENCES CITED

The following references are of record in the file of this patent:

UNITED STATES PATENTS

| Number | Name | Date |
|---|---|---|
| 2,240,583 | Sparks | May 6, 1941 |
| 2,245,721 | Ross | June 17, 1941 |

FOREIGN PATENTS

| Number | Country | Date |
|---|---|---|
| 472,553 | Great Britain | Sept. 27, 1937 |